March 19, 1963 T. W. CARSKADON, SR Re. 25,357

PANT LEG PRESSING MACHINE

Original Filed Oct. 4, 1957 3 Sheets-Sheet 1

INVENTOR
T. W. CARSKADON
Sr.

BY A. Yates Dowell
ATTORNEY

March 19, 1963 T. W. CARSKADON, SR Re. 25,357

PANT LEG PRESSING MACHINE

Original Filed Oct. 4, 1957 3 Sheets-Sheet 2

INVENTOR
T. W. CARSKADON
Sr.
BY H. Yates Dowell
ATTORNEY

PANT LEG PRESSING MACHINE
Original Filed Oct. 4, 1957 3 Sheets-Sheet 3
FIG. 8
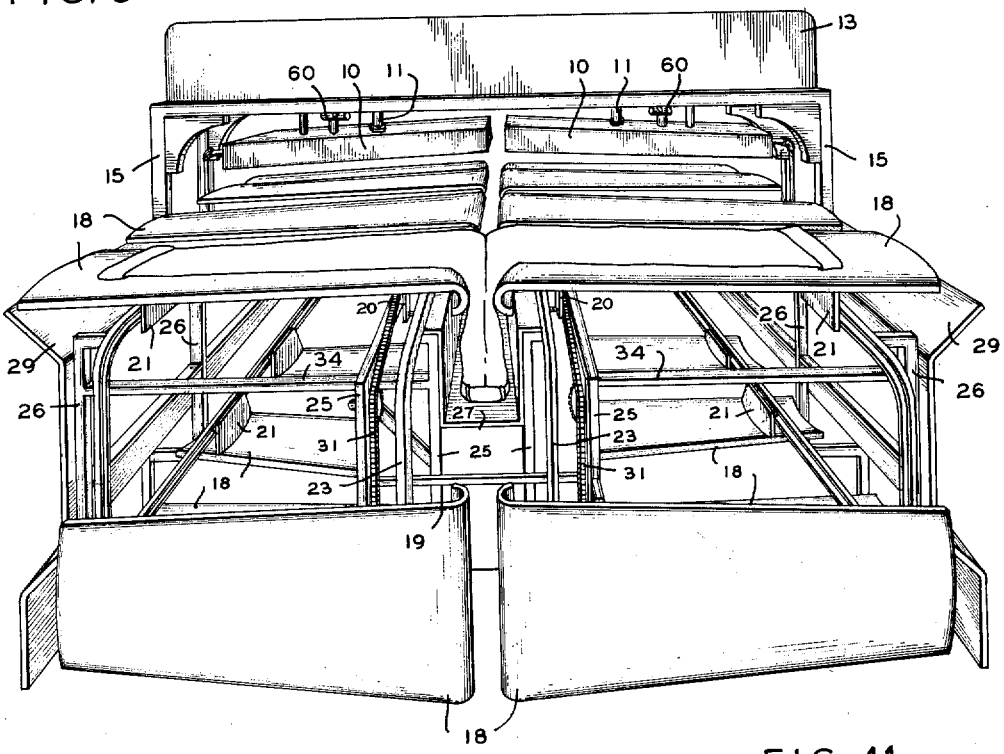
FIG. 9
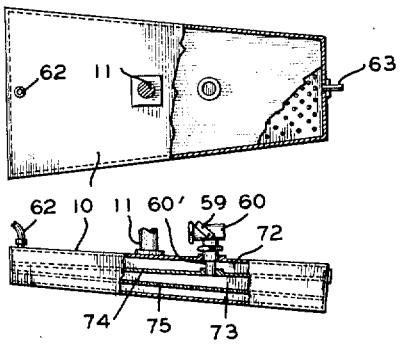
FIG. 10
FIG. 11
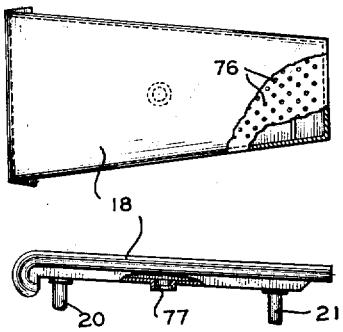
FIG. 12
INVENTOR
T. W. CARSKADON
BY A. Yates Dowell
ATTORNEY United States Patent Office Re. 25,357
Reissued Mar. 19, 1963

25,357
PANT LEG PRESSING MACHINE

Thomas W. Carskadon, Sr., 16 Orchard Lane,
Columbus 2, Ohio

Original No. 2,949,688, dated Aug. 23, 1960, Ser. No. 688,197, Oct. 4, 1957. Application for reissue Dec. 8, 1961, Ser. No. 158,653
6 Claims. (Cl. 38—22)

Figure 1:
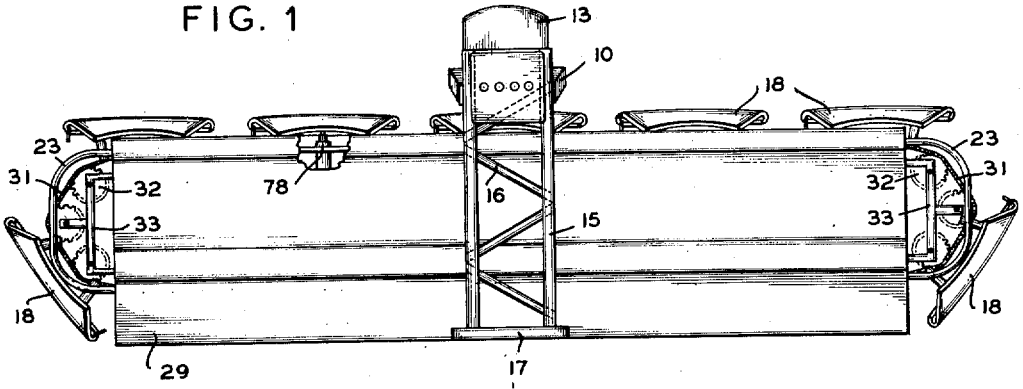

Matter enclosed in heavy brackets [ ] appears in the original patent but forms no part of this reissue specification; matter printed in italics indicates the additions made by reissue.

This invention relates to wearing apparel, to the care and maintenance of the same in a manner that it will be in fresh and attractive condition ready to be worn at all times, and particularly to the care of men's suits, or portions thereof such as the legs of the trousers or pants.

The invention is concerned principally with the pressing of the leg covering portions of trousers or pants and to the equipment employed in such pressing operation in order to press commercially or in substantial volume profitably and in a manner to give the articles pressed the proper appearance.

It has been customary to press trousers or pants in various ways, for example, with flat irons, steam irons, utility presses and the like, but these have become unsatisfactory because of their excessive weight, large size, clumsiness, inefficiency in operation, as well as the amount of time required and the necessity for skilled labor in their operation and the rising costs of both labor and material.

It is an object of the invention to overcome the problems enumerated and to provide equipment by which the pressing of the legs of trousers or pants can be accomplished with minimum effort, in a minimum time, by unskilled labor, and at lower cost.

*A further object of the invention is to provide a machine for simultaneously pressing both legs of a pair of trousers substantially to the crotch.*

*A still further object is to provide supporting pressing bucks which will retain a pair of trousers by both legs without special retaining means.*

Another object of the invention is to provide a relatively simple and inexpensive pants press by which an increased volume of work can be accomplished with greater safety and less exposure to heat or other discomfort, by unskilled labor and with greater precision and satisfaction.

Another object of the invention is to provide a machine of the above character which can be readily loaded and unloaded, which can be caused to automatically or manually press trousers or pants properly without a double crease or other undesirable impression or condition, and with minimum attention other than the loading and unloading of the machine.

A further object of the invention is to provide a pants press including a pressing head and an endless conveyor with individual carriage units which move, step-by-step, in a fixed path respectively to loading, pressing, drying and cooling, and removal stations where they can be loaded, press, cool-dried and subsequently, removed or unloaded, with the operation continuous, as well as a pants press which will satisfactorily and thoroughly perform the functions for which designed and thereby satisfy the requirements of the trade.

A further object of the invention is to provide a press having an endless conveyor, with loading and unloading stations where pants can be placed upon and removed from the conveyor with such loading and unloading stations sufficiently removed from the head to avoid exposure of the operator to excessive heat and with the machine so equipped that it can be operated manually or automatically.

Figure 2:
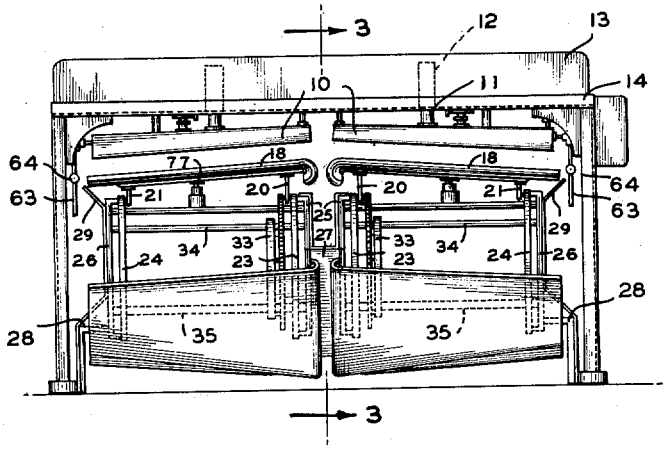
Figure 3:
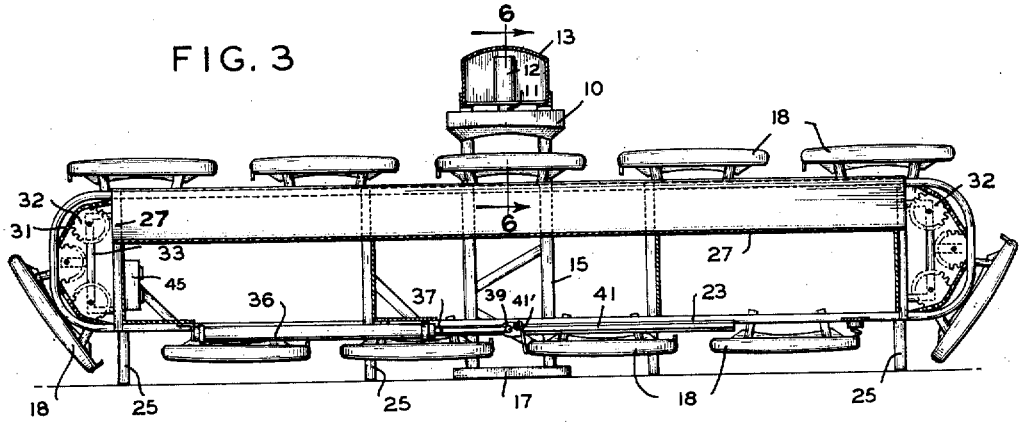
Figure 4:
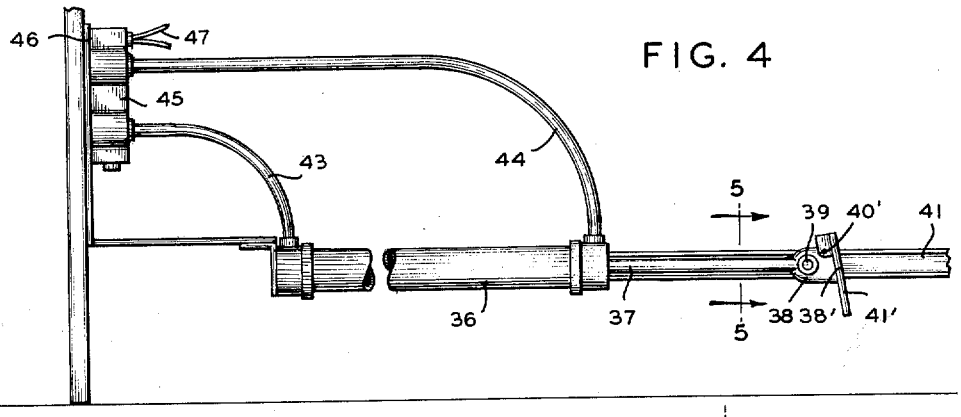
Figure 5A:
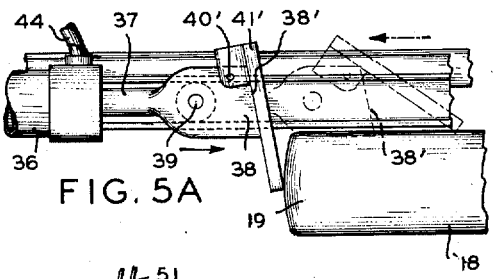
Figure 5:
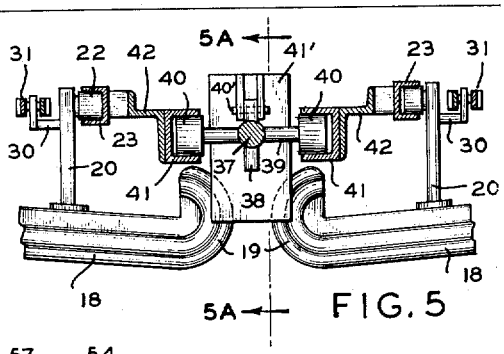
Figure 6:
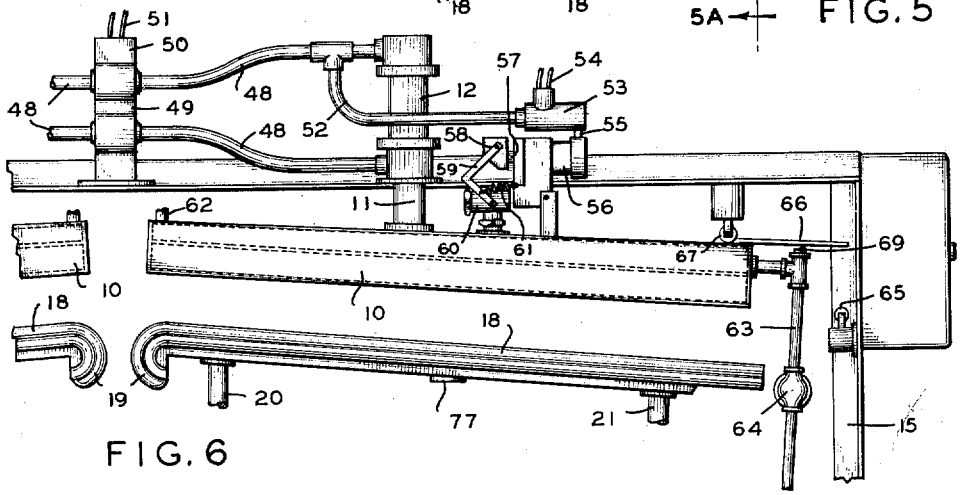
Figure 7:
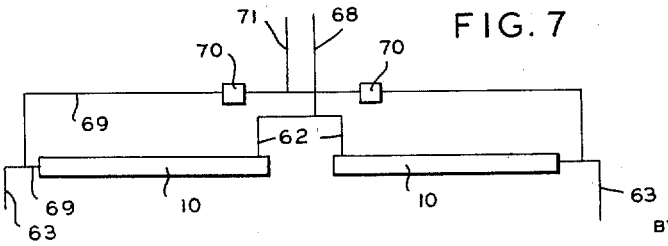

Other objects and advantages of the invention will be apparent from the following description taken in conjunction with the accompanying drawings wherein:

FIG. 1 is a side elevation illustrating one application of the invention;

FIG. 2, an end elevation thereof;

FIG. 3, a longitudinal section on the line 3—3 of FIG. 2;

FIG. 4, an enlarged detail of the indexing or driving mechanism;

FIG. 5, a section on the line 5—5 of FIG. 4;

FIG. 5A, a section on the line 5A—5A of FIG. 5;

FIG. 6, a vertical section on the line 6—6 of FIG. 3;

FIG. 7, a schematic diagram illustrating the path of travel of the steam;

FIG. 8, a perspective of the pressing machine of the present invention viewed from one end thereof;

FIG. 9, a top plan view of the pressing head with parts removed;

FIG. 10, a side elevation or edge view of the head of FIG. 9;

FIG. 11, a top plan view of the traveling lower carrier or cooperating presser member; and FIG. 12, a side or edge elevation of the carrier of FIG. 11.

Briefly stated the invention contemplates the pressing of a pair of diverging trouser legs simultaneously by means of a pair of upper press heads and a cooperating pair of lower carrier or press members. The upper press heads are mounted for vertical reciprocation and are supplied with heating medium while each of the lower carriers or press heads is connected to a roller in an endless track forming a channel. Movement is produced by means of an endless chain mounted on sprockets and driven or moved step by step by a pneumatic cylinder and piston.

The lower cooperating carriers or lower supporting members preferably are spaced along the track uniformly and are adapted to be brought one by one beneath the press head. Due to their spacing, when one of the supporting carriers is beneath the press head, the others are spaced far enough away that they may be approached by an operator without such operator being exposed to excessive heat. For convenience a station two steps away from the presser head on the approach side may be a loading station and another two steps away on the departure side may be an unloading station with a cooling and drying station midway between the pressing station and the removal station.

Movement of the conveyor may be done by a driving or indexing mechanism in the form of a reciprocable driving member such as a piston, the stroke of which corresponds to the distance between the pressing and drying stations which is one-half the distance each between the loading and pressing stations and the pressing and unloading stations. With each stroke of the piston, the conveyor is moved one step causing the supporting members or carriers to travel from the pressing station to the drying station and on the next stroke to the unloading station.

With continued reference to the drawings, the present invention is a pants or trouser leg presser comprising a slightly inclined pair of press heads 10, covered by a cloth or similar material, disposed end to end and carried on the lower ends of pistons 11 which are operated by pressure means. The pressure means are carried in housing 13, mounted on a cross-frame 14 on legs or posts 15 and reinforced by braces 16, with the posts resting on a brace 17.

The press head 10, the temperature of which is controlled in accordance with the material pressed, is vertically movable to engage the upper surface of the trouser or pants leg and in order to provide cooperative means for the complete pressing operation, a series of pairs of cloth covered cooperative *trousers supporting or* carrying members 18 are provided of corresponding inclination, each of the carriers 18 having spaced rounded contiguous ends 19 between which the upper portion of the trousers is adapted to depend while a trouser leg is disposed on top of each of the carriers 18 in a position to be engaged by the press heads 10 and to accomplish the pressing operation.

Each of the opposed carriers 18 is mounted on a pair of supports 20 and 21, near its opposite ends, with the support 20 carrying the rollers 22 located in a channel member 23 forming a track of generally oval-shape and providing an endless path in which the roller 22 can move. The supports 21 likewise carry rollers which are mounted in track 24.

The tracks 23 and 24 are mounted on frames 25 and 26 respectively and the frames 25 are fastened together by connecting members or plates 27, while the frames 26 are supported by L-shaped legs 28. A protective shield 29 is provided for each side of the machine.

In order to produce a machine on which multiple articles may be handled, a series of pair of such carrier members 18 are provided and the supports 20, on which one end of such carrier members are mounted, are joined by a connection 30 to an endless conveyor 31 which may be in the form of a chain or corresponding structure. The conveyor chain 31 is mounted on a trio of sprockets 32 at each end of the machine on supports 33 connected by cross-members 34 and 35 which, in turn, are attached to frame members 25 and 26.

With the construction described, the carrier members may be brought beneath the press heads one pair at a time, to perform the pressing operation. The carriers each are connected to the conveyor chains 31 in uniformly spaced relation in order that the operation may be carried on step-by-step in properly timed relation. The conveyors remain idle while the pressing operation is being accomplished and simultaneous loading and unloading of the carriers is being performed, and also with the structure providing for the drying and cooling of the trousers at the next pause after they have been pressed.

Means is provided for moving each conveyor with the carriers connected thereto in two steps or movements between loading and pressing and between pressing and unloading and with a drying and cooling station mid-way between the pressing and the unloading station, but consequently only one step from each.

In order to move the carrier members 18 as shown in FIGS. 3, 4, 5 and 5A there is provided a pneumatic cylinder 36, having a piston rod 37 with a flattened end portion 38 encircling a pin 39. The ends of the pin 39 are provided with rollers 40 movably located in parallel tracks 41 supported by brackets 42, attached to tracks 23.

The flattened end portion 38 of the piston rod 37 is provided with a slightly inclined end surface 38'. The end portion 38 is connected by means of a pivot 40', to a pair of legs attached to a push plate 41' which abuts the inclined surface 38' in such a manner that, when the piston is forced outwardly of its cylinder, the plate 41' will engage the rear edges of a pair of carriers 18 and through the conveyor chains 31 the other carriers of the conveyor. On the return stroke of the piston in its cylinder 36, the plate 41' will ride over the next succeeding pair of such carriers which have been moved by the chains 31 into the position formerly occupied by the carriers which were pushed. The stroke of the piston is of a length corresponding to the distance between the pressing and drying stations and approximately one-half the distance between the loading and pressing stations and the pressing and unloading stations.

In order to operate the piston 37 in the cylinder 36, a pair of air lines 43 and 44 are provided having connections at the opposite ends of such cylinder. The other ends of the lines 43 and 44 are connected to a selector or control valve 45, FIGS. 3 and 4, under the influence of an electric actuator 46, receiving energy from a suitable power source through conductors 47.

In order to raise and lower the press heads 10 fluid is admitted to the cylinders 12 through lines 48 and selector valve 49 under the influence of an electric activator 50, receiving energy from a source of supply through conductors 51. Fluid is alternately supplied through the lines 48 and to the opposite ends of the cylinder 12 to raise and lower the press head 10. A flexible by-pass line 52 is connected to a steam release valve mechanism for controlling the steam from the press head. This operation may be accomplished in various ways, as, for example, by an electrically controlled gate valve 53 receiving electrical energy from a source of supply through conductors 54. Such gate valve controls the flow of fluid through a connection 55 to one end of a cylinder 56, containing a piston 57 having a head 58 pivotally connected by a bell crank lever 59 to a valve 60 which permits the escape of steam from the presser head 10, a spring 61[,] serving to return the piston 57 to its initial position.

Steam is admitted to each of the press heads 10 through a flexible inlet pipe 62 from a suitable source and a discharge pipe 63, at the lower end of the press head, is provided for the escape of condensed moisture. The discharge line 63 may be provided with a manually controlled valve 64 which can be opened periodically to remove condensation. In operation, the press head 10 is forced downwardly against the carrier 18 until time switch 65 attached to frame 15, is engaged by a projection 66 carried by the press head 10. Time switch 65 opens the gate valve 53 and fluid from the by-pass line 52 opens valve 60 to permit steam to escape from the press head for a limited period after which the press head is elevated until it comes in contact with the time switch 67, which energizes the selector switch 46 which, in turn, operates control valve 45 to move the conveyor another step. The flexible inlets 62 are supplied through a common line 68 from a source of steam supply not shown. Steam passes through the press heads 10 then through a flexible return line 69 and steam trap 70 back to the boiler or other source of supply through a common line 71.

As disposed in FIGS. 8 and 9, the press head is composed of an elongated hollow member slightly narrower at one end and with a concave bottom surface. The member is composed of upper and lower chambers 72 and 73 with an intermediate partition *74* and the lower plate is provided with perforations 75 through which steam is discharged onto the trousers being pressed. Steam is maintained under pressure in the upper chamber 72 until such time as valve 60 moves plunger 60' out of engagement with its seat and permits steam to be discharged into the lower chamber 73 and out through the perforations 75.

The carrier member 18 is of similar configuration and is provided with small openings 76 for the circulation of steam and for the evacuation of steam between the press head 10 and the lower cooperating carrier members 18. Also, the carrier support is provided with a valve-controlled evacuating connection 77 for the reception of vacuum nozzles 78 which remove steam from the carrier members to dry and cool the trousers after the pressing operation.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. A machine for pressing both legs of a pair of trousers comprising a support for the trousers having spaced leg supporting portions for each leg of a pair of trousers, a conveyor carrying said trousers support, pressing means including a pressing head for cooperation with each supporting portion for pressing each leg of the pair of trousers against its supporting portion, said conveyor providing means to move said trousers support relative to said pressing means whereby a pair of trousers can be placed on said support without interference from said presser means with the trousers legs overlying the support portions, and means to simultaneously move said presser heads toward the cooperating support portion when the support portions and the trousers being supported thereon are in juxtaposition to said presser heads.

2. The invention according to claim 1 in which the trousers support has the supporting portions in generally horizontal end to end relation spaced apart a distance to receive the body of the trousers between the support portions so such body of the trousers may hang down by gravity between said support portions while the trousers legs are supported on the support portions whereby both legs may be pressed simultaneously.

3. The invention according to claim 1 in which the conveyor is made of endless elements and the [trouser supports are] *trousers support is* mounted on said endless elements and the supporting portions are spaced apart a distance to permit the body of the trousers to hang down by gravity between said support portions while the trousers legs are supported on the support portions whereby both legs may be pressed simultaneously.

4. A machine for simultaneously pressing both legs of a pair of trousers comprising a support for the trousers having spaced leg supporting portions for each leg of a pair of trousers, *said leg supporting portions having their crotch ends closely spaced to receive the collapsed waist portion of a pair of trousers,* movable mounting means carrying said trousers support, pressing means including a pressing head for cooperation with each supporting portion for pressing each leg of the pair of trousers against its supporting portion, said movable mounting means providing means to move said trousers support relative to said pressing means whereby a pair of trousers can be placed on said support without interference from said presser means with the trousers legs overlying the support portions, and means simultaneously to move said presser heads toward the cooperating support portion when the support portions and the trousers being supported thereon are in juxtaposition to said presser heads.

*5. A machine for simultaneously pressing both pant legs of a pair of trousers comprising a first generally planar horizontally extending supporting member for one leg of a pair of trousers, said supporting member for one leg of a pair of trousers being of a length and width to completely support one pant leg to the crotch, a second generally planar horizontally extending supporting member for the other leg of a pair of trousers, said supporting member for the other leg of a pair of trousers being of a length and width to completely support the other pant leg to the crotch, the crotch end of said first supporting member being spaced from the crotch end of said second supporting member a sufficient distance to receive the waist portion of the trousers from the crotch to the waistband while assuring support of the trousers legs substantially to the crotch, said first and second supporting members being substantially in longitudinal alignment, a first pressing head mounted above the first supporting member, a second pressing head mounted above the second supporting member, means to relatively move said pressing heads and said supporting members together in pressing engagement to simultaneously press both legs of a pair of trousers.*

*6. The invention according to claim 5 in which the trousers leg supporting members have their crotch ends at a higher elevation than the outer ends.*

References Cited in the file of this patent or the original patent

UNITED STATES PATENTS

| | | |
|---|---|---|
| Re. 22,937 | Bicknell et al. | Nov. 25, 1947 |
| 865,263 | Moe | Sept. 3, 1907 |
| 1,721,316 | Pribil | July 16, 1929 |
| 1,841,005 | Braun | Jan. 12, 1932 |
| 1,851,467 | Tanner | Mar. 29, 1932 |
| 1,896,518 | Johnson | Feb. 7, 1933 |
| 1,942,254 | McGowan | Jan. 2, 1934 |
| 2,388,392 | Davies | Nov. 6, 1945 |
| 2,765,549 | Binns et al. | Oct. 9, 1956 |
| 2,931,546 | Brunier | Apr. 5, 1960 |
| 2,994,978 | Skovira | Aug. 8, 1961 |

FOREIGN PATENTS

| | | |
|---|---|---|
| 476,537 | Canada | Aug. 28, 1951 |